K. WOLF.
ROLLER BEARING.
APPLICATION FILED DEC. 19, 1913.
1,158,880.
Patented Nov. 2, 1915.
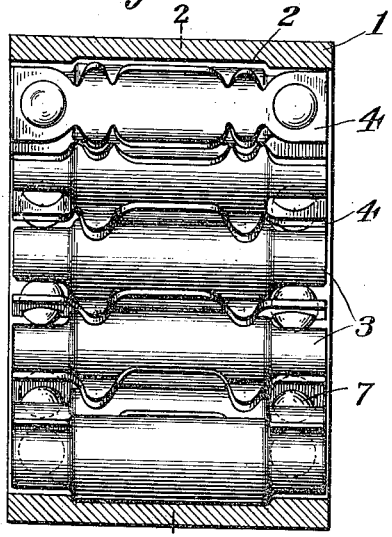
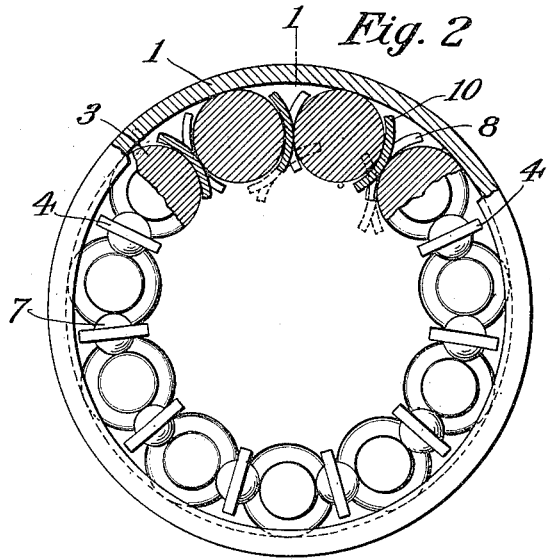
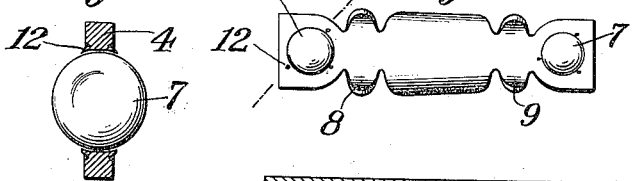
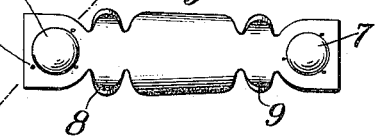
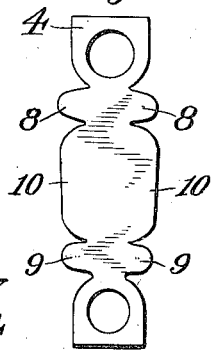
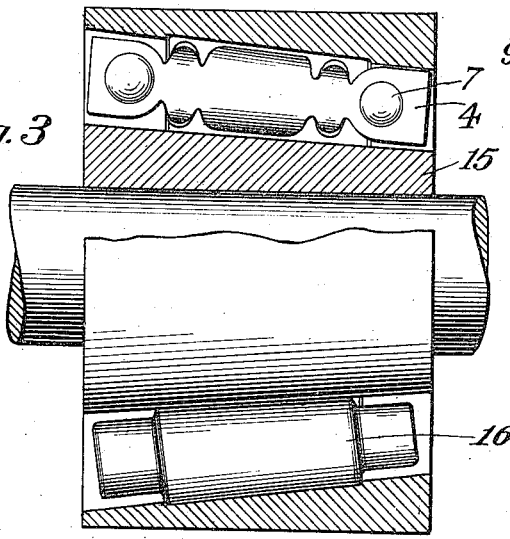
Witnesses:
M. E. Eveland
L. E. Johnston
Inventor
Karl Wolf
By his Attorney
W. B. Morton

UNITED STATES PATENT OFFICE.

KARL WOLF, OF BROOKLYN, NEW YORK, ASSIGNOR TO GLOBE ANTI-FRICTION ROLLER BEARING COMPANY, OF BROOKLYN, NEW YORK.

ROLLER-BEARING.

1,158,880.  Specification of Letters Patent.  Patented Nov. 2, 1915.

Application filed December 19, 1913. Serial No. 807,606.

*To all whom it may concern:*

Be it known that I, KARL WOLF, citizen of the United States, and a resident of Brooklyn, in the county of Kings and State of New York, have invented new and useful Improvements in Roller-Bearings, of which the following is a specification.

This invention relates to roller bearings, particularly of the character disclosed in the patent application of John Newmann, #688,333, filed December 28, 1911, and has for its object to improve the construction of the bearing by providing a novel form of spacing device which is both lighter and stronger than that disclosed in the pending application, which is of much simpler and cheaper construction and which permits of a greater number of bearing rollers being employed in a bearing of the same size and otherwise improves the construction of the device as will be hereinafter described.

In the accompanying drawings forming a part of this application, I have disclosed a preferred form of my invention applied both as a cylindrical bearing and as a tapered bearing. It is to be understood however that the improved spacer may be employed in various other types of bearings, for instance the split bearing disclosed in the patent to John Newmann, No. 1,037,510 dated September 3, 1912.

In the said drawings Figure 1 is a cross section through the outer member of a cylindrical bearing constructed in accordance with my invention; Fig. 2 is an end view of the part shown in Fig. 1; Fig. 3 is a sectional view of a tapered bearing constructed in accordance with my invention; and Figs. 4, 5, 6 and 7 are detailed views showing the construction of my improved spacer.

Referring now to the drawings, and particularly Figs. 1 and 2, 1 indicates the outer member of the bearing, here shown as a cylindrical sleeve having in its inner surface a central annular depression 2, extending through about two-thirds the length of the sleeve. It is understood that the surface of this depression is ground to form the bearing surface for the rollers 3 which are arranged in the shell in the usual manner, between the shell and the inner member 5 of the bearing and with their axes parallel with the axis of rotation 6. As shown, the rollers are enlarged throughout the middle portion of their length equal to the length of the annular depression of the sleeve 1, the ends of the rollers being sufficiently reduced to be free of engagement with the adjacent edges of the sleeve. The rollers are not in contact with each other, but between each pair of rollers there is interposed a spacer 4 comprising a piece of sheet metal of a length about equal to the length of the rollers and having at each end opposite the reduced ends of the rollers a transverse perforation in which is mounted an anti-friction bearing ball 7. The diameter of the ball 7 is such with regard to the thickness of the spacer that the reduced ends of the roller come in contact with the ball before the central enlarged portion of the roller engages the spacer. Or as may be otherwise expressed, there is a slight clearance between the surface of the roller and the face of the spacer.

In order that the rollers and spacers may properly maintain themselves in operative position, the edges of the spacer are cut in the patterns shown in Fig. 4 with a pair of notches at each end and on each edge of the spacer adjacent the balls whereby two narrow tongues 8, 8—9, 9 are provided at each end of the spacer respectively. The tongues are all bent or curved to correspond to the curvature of the rollers while the portions 10 of the edges of the spacers between the tongues are curved in the same manner but in the opposite direction to embrace the adjacent roller as clearly shown in Fig. 2. To hold the balls 7 in place during the assembling of the bearing, the edge of the hole in which the ball is inserted is punched over at three or four points around the ball with a light punch or other suitable instrument, as indicated at 12 in Fig. 7.

It will be understood that in assembling the bearing the rollers and spacers are laid in the annular groove of the shell 1 in the position shown until all but one roller is in place. To get the last roller into position the spacers on the opposite sides of the vacant position are turned as shown in the dotted line in Fig. 2, until the roller can be inserted between them, and then the roller is forced into engagement with the face of the sleeve. The parts will then remain in their proper position by reason of the fact that it is possible for one roller to move inwardly only when all the other parts of the bearing are in their extreme outer position.

As the annular flanges at the end of the central depression hold the rollers against axial movement, and the balls hold the spacers against axial movement relative to the rollers, the entire device will retain itself in assembled position without exterior support of any kind.

In Fig. 3 I have illustrated the spacer as applied to a tapered bearing, and this spacer is also illustrated in Figs. 4, 5 and 6. In this bearing the central or inner member 15 is tapered instead of cylindrical and the central enlarged portions of the rollers 16 are also tapered to correspond. The spacer employed in this bearing is the same as in the cylindrical bearing except that it is narrower at the end intended for engagement with the small end of the roller, and the ball at the smaller end of the spacer is necessarily of smaller diameter to accommodate the shorter distance between the reduced ends of the roller. The inner surface of the outer member of the bearing is of course tapered to correspond with the taper of the rollers and is provided with a central annular depression embracing the enlarged portions of the rollers.

It will be observed that my improved spacer may be very cheaply made by a single operation of an ordinary die press which simultaneously cuts out the blank spacer from the sheet of metal stock, and bends the tongues and edges in the opposite direction. As there is no strain or wear on the spacer it may be made of light, soft material such as is easily cut and shaped and which adds little weight to the bearing and occupies but a very little of the space between the rollers. The balls of course are ordinary bearing balls and are easily and readily mounted in the spacer against displacement.

It will be understood that my invention is of course not limited to the exact design disclosed, as any suitable design providing a plurality of separate tongues along the opposite edges for bending in the opposite directions may be employed instead.

Having thus described my invention, what I claim and desire to secure by Letters Patent is:

1. In a roller bearing, the combination of a supporting and a supported member, a series of rollers interposed between said members and spacers alternating with said rollers, said spacers comprising separate pieces extending parallel with said rollers and having different longitudinal portions of their edges curved in opposite directions to embrace the rollers on the opposite sides thereof.

2. In a roller bearing, the combination of inner and outer members, a series of rollers interposed between said members, spacers alternating with said rollers, said spacers comprising separate sheet metal pieces extending parallel with said rollers and having different longitudinal portions of their opposite edges curved in opposite directions to embrace the rollers on opposite sides thereof and having balls mounted in said spacers and engaging said rollers.

3. In a roller bearing, the combination of inner and outer members, a series of rollers having portions of reduced diameter interposed between said members, spacers alternating with said rollers, said spacers comprising separate sheet metal pieces extending parallel with said rollers and having different longitudinal portions of their edges curved in opposite directions to embrace the enlarged portions of the adjacent rollers, and balls mounted in said spacers and engaging the reduced portions of said rollers.

4. In a roller bearing, the combination of inner and outer members, a series of rollers having portions of reduced diameter interposed between said members, spacers alternating with said rollers, said spacers comprising separate sheet metal pieces having their main faces substantially radial to the center of rotation and provided with notches in their edges forming a plurality of tongues, certain of said tongues being curved in opposite directions to embrace the enlarged portions of the adjacent rollers, and balls mounted in said spacers and engaging the reduced portions of said rollers.

5. A spacer for roller bearings comprising a sheet metal bar having notches in its edges forming a plurality of tongues, certain of which tongues are curved in opposite directions, said tongues being disposed to provide portions curving in the same direction at points remote from the transverse middle line of the bar on each side thereof, and anti-friction balls set in perforations in said bars and held in place by projections on the edges of said perforations.

6. A spacer for roller bearings comprising a sheet metal bar having notches in its edges forming narrow tongues near each end of the bar and an intermediate tongue or extension, said intermediate tongue or extension and said end tongues being curved in opposite directions, and anti-friction balls carried by the ends of said bar beyond said tongues.

Signed at New York in the county of New York and State of New York this 6th day of December, 1913.

KARL WOLF.

Witnesses:
W. B. MORTON,
L. E. JOHNSTON.